(12) United States Patent
Ise

(10) Patent No.: US 6,185,361 B1
(45) Date of Patent: Feb. 6, 2001

(54) INFORMATION SIGNAL PROCESSING APPARATUS FOR DETECTING BOTH DROPOUT OF INFORMATION SIGNALS AND ABSENCE THEREOF

(75) Inventor: Makoto Ise, Tokyo (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/385,727

(22) Filed: Feb. 8, 1995

Related U.S. Application Data

(63) Continuation of application No. 07/898,463, filed on Jun. 15, 1992, now abandoned.

(30) Foreign Application Priority Data

Jun. 19, 1991 (JP) .................................................. 3-147388

(51) Int. Cl.[7] .................................................. H04N 5/76
(52) U.S. Cl. .................................. 386/51; 386/47; 348/616
(58) Field of Search .................................. 358/335, 310, 358/314, 336, 340; 348/616, 617; 360/38.1, 33.1; 386/51, 47; H04N 5/76, 5/92, 9/79, 5/94, 5/21, 5/213, 5/217

(56) References Cited

U.S. PATENT DOCUMENTS

| | | | | |
|---|---|---|---|---|
| 3,912,858 | * | 10/1975 | Kenney | 358/314 |
| 4,847,709 | * | 7/1989 | Uehara et al. | 358/336 |
| 4,893,192 | * | 1/1990 | Takemura | 358/336 |
| 4,977,461 | * | 12/1990 | Ichimura | 358/314 |
| 5,050,002 | * | 9/1991 | SuzUki et al. | 358/314 |
| 5,105,282 | * | 4/1992 | Taguchi | 358/336 |
| 5,126,853 | * | 6/1992 | Mashimo et al. | 358/336 |
| 5,223,946 | * | 6/1993 | Mannen | 358/314 |

* cited by examiner

Primary Examiner—Thai Tran
(74) Attorney, Agent, or Firm—Robin, Blecker & Daley

(57) ABSTRACT

An information signal processing apparatus is arranged to detect an amplitude level of an input information signal with a first time constant and to obtain a first amplitude level detection signal which corresponds to the amplitude level of the input information signal detected; to detect an amplitude level of the input information signal with a second time constant which differs from the first time constant and to obtain a second amplitude level detection signal which corresponds to the amplitude level of the input information signal thus detected; to compare the first and second amplitude level detection signals with each other; and to detect any dropout of the input information signal according to the result of comparison.

4 Claims, 4 Drawing Sheets

INFORMATION SIGNAL PROCESSING APPARATUS FOR DETECTING BOTH DROPOUT OF INFORMATION SIGNALS AND ABSENCE THEREOF

This is a continuation application under 37 CFR 1.62 of prior application Ser. No. 07/898,463, filed Jun. 15, 1992, now abandoned.

BACKGROUND OF THE INVENTION

1. Field of the Invention

This invention relates to an information signal processing apparatus for processing information signals.

2. Description of the Related Art

Known apparatuses designed for processing information signals include information signal recording/reproducting apparatuses which record information signals on recording media and reproduce the recorded information signals from the recording media.

Among the information signal recording/reproducing apparatuses, a video tape recorder or a still video camera is arranged, for example, to record an image signal on a magnetic recording medium after frequency-modulating the image signal and to restore the frequency-modulated image signal recorded on the medium to the original image signal by frequency-demodulating the signal.

In the video tape recorder or a still video camera, a temporary attenuation of amplitude, called a dropout, often takes place in the signal reproduced from the magnetic recording medium at the time of reproduction due to various causes such as a foul or clogged state of a magnetic head and dust sticking to or scars left in the magnetic recording medium. Then, the demodulated signal waveform of the image signal obtained by frequency-demodulating the reproduced signal which has the dropout becomes a signal waveform which resembles a white noise waveform and greatly degrades the picture quality of the restored image signal, because the normal demodulating action of a frequency demodulator is hindered by the occurrence of the dropout. In view of this, the conventional video tape recorder (VTR) or still video camera has been provided with a dropout compensation circuit which is arranged as shown in FIG. 1 to improve the picture quality by making compensation for the dropout occurring in the image signal reproduced.

Referring to FIG. 1, a weak reproduced signal obtained from a magnetic recording medium by a magnetic head which is not shown is amplified by a preamplifier 26. The reproduced signal thus amplified is supplied to a recorded/unrecorded detector 27, a frequency demodulator 28 and a dropout detector 29.

The recorded/unrecorded detector 27 is arranged to find if any image signal is recorded or not recorded in each track on the magnetic recording medium currently under the reproducing action of the magnetic head on the basis of the level of the signal reproduced. A detection signal which indicates the result of detection is outputted from an output terminal 34.

Further, if the detection signal outputted from the output terminal 34 indicates the presence of the record of the image signal in a track on the magnetic recording medium, a tracking control mechanism which is not shown performs tracking control in such a way as to cause the magnetic head to trace an optimum position of the track on the magnetic recording medium. The recorded/unrecorded detector 27 has its time constant set at a relatively long period of time of the order of several milliseconds for detection of any recorded signal. The length of this period corresponds to some fraction of one vertical scanning period of the TV signal.

A dropout compensation process is performed after the detection of recorded or unrecorded state of the image signal and the tracking control are performed in the manner described above.

At the frequency demodulator 28, the reproduced signal supplied from the preamplifier 26 is first frequency-demodulated. The demodulated image signal outputted from the frequency demodulator 28 is supplied as it is to one terminal A of an analog switch 32. The demodulated image signal outputted from the frequency demodulator 28 is supplied also to a 1-H delay line 31 which is composed of such elements as a CCD (charge-coupled device), etc., to be delayed as much as one H (H: one horizontal scanning period of a TV signal). The one-H delayed demodulated image signal is supplied to another terminal B of the analog switch 32. The analog switch 32 is normally in connection with the terminal A. The switch 32 is, however, connected to the other terminal B upon detection by the dropout detector 29 of occurrence of a dropout in the reproduced signal supplied from the preamplifier 26. With the switch 32 connected to the terminal B, the frequency-demodulated reproduced signal which has been delayed by one H period and has no dropout is outputted in place of the frequency-demodulated signal having a dropout. A dropout compensating action is carried out in this manner.

The details of the dropout detector 29 of FIG. 1 are described below with reference to FIG. 2:

As shown in FIG. 2, the dropout detector 29 is composed of an automatic gain adjustment circuit 37, an envelope detection circuit 38 and a pulse shaping circuit 39. Generally, the reproduced signal supplied from the preamplifier 26 of FIG. 1 has some fluctuations or waviness in amplitude due to uneven contact of a magnetic head with a magnetic recording medium or the magnetic orientation characteristic, etc., of the magnetic recording medium.

Therefore, in detecting the dropout, the adverse influence of the amplitude fluctuations is eliminated by causing the reproduced signal supplied from the preamplifier 26 of FIG. 1 to pass through the automatic gain adjustment circuit 37 of FIG. 2. After that, dropout detection is made at the envelope detection circuit 38 by following minute dropout parts at short time constant of the order of several hundred nanoseconds. A detection signal which is thus outputted from the envelope detection circuit 38 is supplied to the pulse shaping circuit 39. At the pulse shaping circuit 39, the pulse width and the time base of the detection signal are corrected in such a way as to make them correspond to the white noise generated in the demodulated signal outputted from the above-stated frequency demodulator 28 due to the occurrence of dropout. After the correction, the detection signal is supplied to the above-stated analog switch 32 as dropout detection pulses. The analog switch 32 is connected to the terminal B for the period during which the dropout is occurring in the reproduced signal. By this, the demodulated signal which has become the white noise due to the occurrence of the dropout is replaced with the demodulated signal which is obtained one horizontal scanning (H) period before. As a result, a dropout-compensated image signal is outputted from the output terminal 35 of FIG. 1.

In the dropout detector which is used for the dropout compensation process described above, the automatic gain adjustment circuit is deemed to be indispensable for the input stage of the circuit arrangement. Generally the automatic gain adjustment circuit consists of a detector for detecting the amplitude of the input signal and a variable gain amplifier which is controlled by the output of the detector. These circuits require many elements and are, therefore, not suited for discrete circuit arrangement.

In view of this, it has been practiced to have the dropout detector including the above-stated automatic gain adjustment circuit arranged as a custom-made IC or to utilize a multi-function signal processing IC which already includes a dropout detector and is adapted for a video tape recorder or the like.

However, with the dropout detector arranged to be a custom-made IC, it results in a great cost increase in the event of manufacture in a small quantity. In the case of use of a dropout detector which is supplied in a state of being included in a multi-function IC, if the functions of the IC are to be efficiently utilized, signal processing methods other than the dropout detecting method must be also arranged to comply with the multi-function IC. This imposes restrictions on design work.

SUMMARY OF THE INVENTION

It is a general object of this invention to provide an information signal processing apparatus which is arranged to solve the above-stated problems.

It is a more specific object of this invention to provide an information signal processing apparatus which is capable of detecting the dropouts of information signals with a simple arrangement.

Under this object, an information signal processing apparatus arranged to process information signals according to this invention as an embodiment thereof comprises first amplitude level detecting means arranged to have a first time constant, to detect an amplitude level of an input information signal and to output a first amplitude level detection signal which corresponds to the amplitude level detected; second amplitude level detecting means arranged to have a second time constant which differs from the first time constant, to detect an amplitude level of the input information signal and to output a second amplitude level detection signal which corresponds to the amplitude level detected; and input information signal dropout detecting means arranged to make a comparison between the first amplitude level detection signal outputted from the first amplitude level detecting means and the second amplitude level detection signal outputted from the second amplitude level detecting means and to detect a dropout of the input information signal on the basis of a result of the comparison.

It is another object of the invention to provide an information signal processing apparatus which is arranged to permit a reduction in size and weight thereof.

Under that object, an information signal processing apparatus arranged to process information signals according to this invention as an embodiment thereof comprises amplitude attenuating means arranged to attenuate the amplitude of an input information signal and to output a resultant signal; first amplitude level detecting means arranged to have a first time constant, to detect an amplitude level of the signal outputted from the amplitude attenuating means and to output a first amplitude level detection signal which corresponds to the amplitude level detected; second amplitude level detecting means arranged to have a second time constant which differs from the first time constant, to detect an amplitude level of the input information signal and to output a second amplitude level detection signal which corresponds to the amplitude level detected; and input information signal dropout detecting means arranged to make a comparison between the first amplitude level detection signal outputted from the first amplitude level detecting means and the second amplitude level detection signal outputted from the second amplitude level detecting means and to detect a dropout of the input information signal on the basis of a result of the comparison.

It is a further object of the invention to provide an information signal processing apparatus which is arranged to permit a reduction in cost.

Under the above-stated object, an information signal processing apparatus arranged to process information signals as an embodiment of this invention comprises amplitude attenuating means arranged to attenuate the amplitude of an input information signal and to output a resultant signal; signal output means arranged to receive the signal outputted from the amplitude attenuating means and the input information signal and to selectively output either the signal outputted from the amplitude attenuating means or the input information signal; first amplitude level detecting means arranged to have a first time constant, to detect an amplitude level of the signal outputted from the signal output means and to output a first amplitude level detection signal which corresponds to the amplitude level detected; second amplitude level detecting means arranged to have a second time constant which differs from the first time constant, to detect an amplitude level of the input information signal and to output a second amplitude level detection signal which corresponds to the amplitude level detected; and input information signal dropout detecting means arranged to make a comparison between the first amplitude level detection signal outputted from the first amplitude level detecting means and the second amplitude level detection signal outputted from the second amplitude level detecting means and to detect a dropout of the input information signal on the basis of a result of the comparison.

It is a further object of the invention to provide an information signal processing apparatus which is simply arranged and yet is capable of detecting a dropout of an information signal reproduced from a recording medium.

Under this object, an information signal processing apparatus arranged as an embodiment of this invention to process an information signal recorded on a recording medium comprises: reproducing means arranged to reproduce the information signal recorded on the recording medium and to output a reproduced information signal; first amplitude level detecting means arranged to have a first time constant, to detect an amplitude level of the reproduced information signal outputted from the reproducing means and to output a first amplitude level detection signal which corresponds to the amplitude level detected; second amplitude level detecting means arranged to have a second time constant which differs from the first time constant, to detect an amplitude level of the reproduced information signal outputted from the reproducing means and to output a second amplitude level detection signal which corresponds to the amplitude level detected; and reproduced information signal dropout detecting means arranged to make a comparison between the first amplitude level detection signal outputted from the first amplitude level detecting means and the second amplitude level detection signal outputted from the second amplitude level detecting means and to detect a dropout of the reproduced information signal outputted from the reproducing means on the basis of a result of the comparison.

It is a further object of the invention to provide an information signal processing apparatus which reproduces information signals recorded on a recording medium and is arranged to permit a reduction in size and weight of the apparatus.

Under that object, an information signal processing apparatus arranged as an embodiment of the invention to process an information signal recorded on a recording medium comprises reproducing means arranged to reproduce the information signal recorded on the recording medium and to output a reproduced information signal; amplitude attenuating means arranged to attenuate the amplitude of the reproduced information signal outputted from the reproducing means and to output a resultant signal; first amplitude level detecting means arranged to have a first time constant, to detect an amplitude level of the signal outputted from the amplitude attenuating means and to output a first amplitude level detection signal which corresponds to the amplitude level detected; second amplitude level detecting means arranged to have a second time constant which differs from the first time constant, to detect an amplitude level of the reproduced information signal outputted from the reproducing means and to output a second amplitude level detection signal which corresponds to the amplitude level detected; and reproduced information signal dropout detecting means arranged to make a comparison between the first amplitude level detection signal outputted from the first amplitude level detecting means and the second amplitude level detection signal outputted from the second amplitude level detecting means and to detect a dropout of the reproduced information signal outputted from the reproducing means on the basis of a result of the comparison.

It is a still further object of the invention to provide an information signal processing apparatus which reproduces information signals recorded on a recording medium and is arranged to permit a reduction in cost of the apparatus.

Under the above-stated object, an information signal processing apparatus arranged as an embodiment of this invention to process an information signal recorded on a recording medium comprises reproducing means arranged to reproduce the information signal recorded on the recording medium and to output a reproduced information signal; amplitude attenuating means arranged to attenuate the amplitude of the reproduced information signal outputted from the reproducing means and to output a resultant signal; signal output means arranged to receive the signal outputted from the amplitude attenuating means and the reproduced information signal outputted from the reproducing means and to selectively output either the signal outputted from the amplitude attenuating means or the reproduced information signal outputted from the reproducing means; first amplitude level detecting means arranged to have a first time constant, to detect an amplitude level of the signal outputted from the signal output means and to output a first amplitude level detection signal which corresponds to the amplitude level detected; second amplitude level detecting means arranged to have a second time constant which differs from the first time constant, to detect an amplitude level of the reproduced information signal outputted from the reproducing means and to output a second amplitude level detection signal which corresponds to the amplitude level detected; and reproduced information signal dropout detecting means arranged to make a comparison between the first amplitude level detection signal outputted from the first amplitude level detecting means and a second amplitude level detection signal outputted from the second amplitude level detecting means and to detect a dropout of the reproduced information signal outputted from the reproducing means on the basis of a result of the comparison.

The above and other objects and features of this invention will become apparent from the following detailed description of embodiments thereof taken in conjunction with the accompanying drawings.

DETAILED DESCRIPTION OF THE PREFERRED EMBODIMENTS

Figure 1:
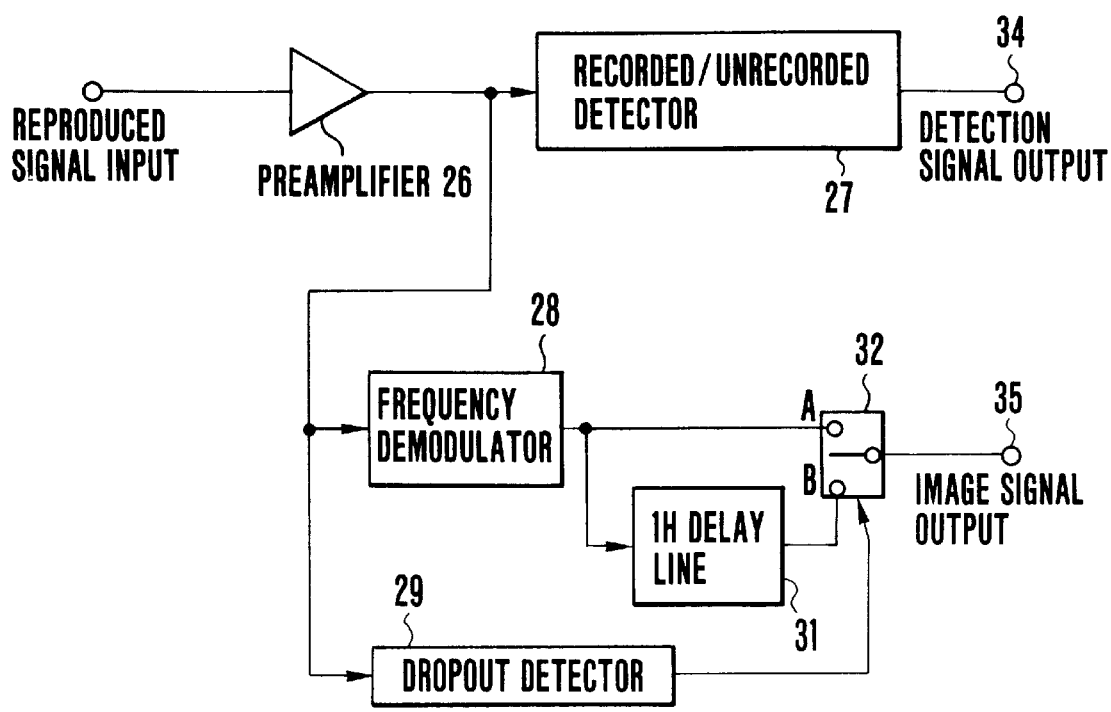
FIG. 1 is a block diagram showing in outline the arrangement of a dropout compensation circuit.
Figure 2:
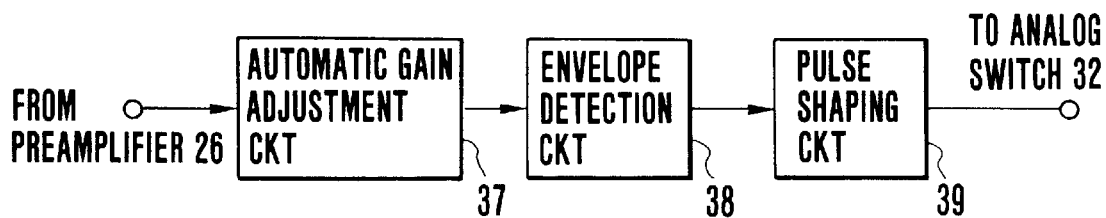
FIG. 2 is a block diagram showing in outline the arrangement of a dropout detector shown in FIG. 1.
Figure 3:
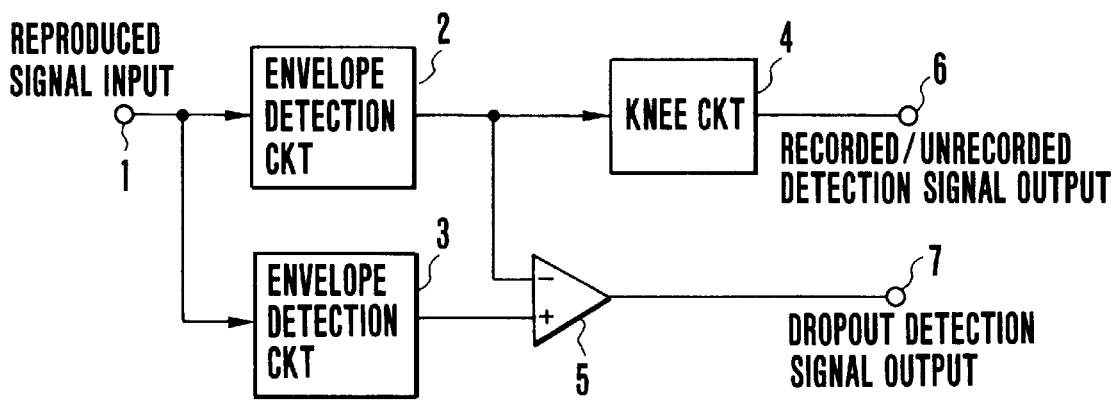
FIG. 3 is a block diagram showing in outline the arrangement of a dropout detector to which this invention is applied as a first embodiment thereof.
Figure 4:
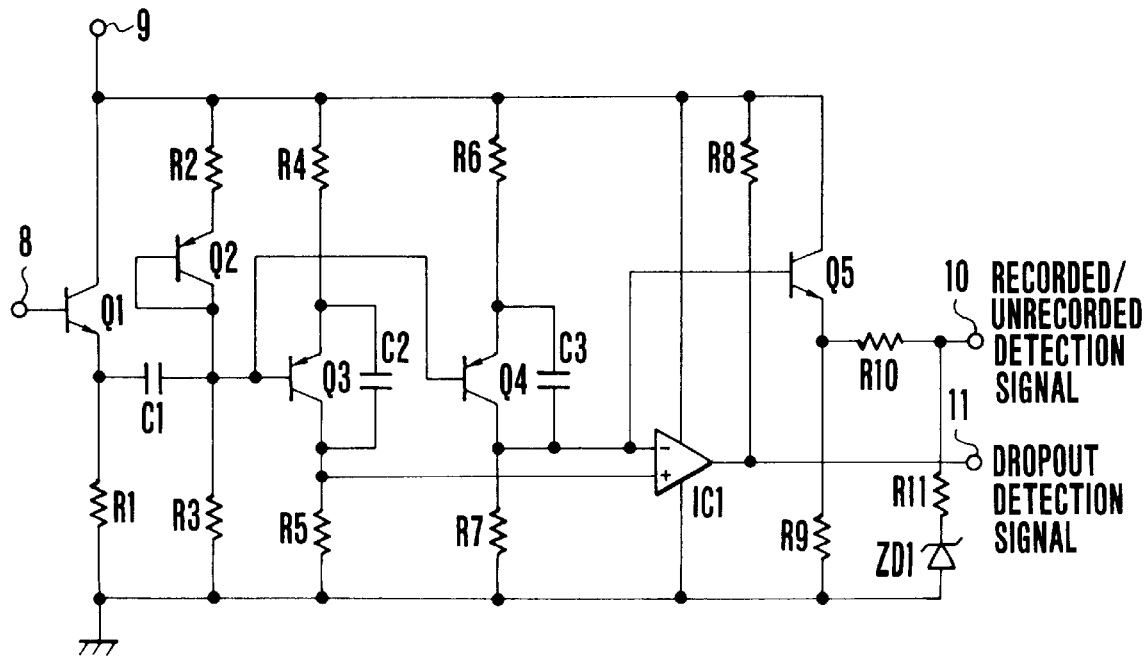
FIG. 4 is a circuit diagram showing the details of the dropout detector shown in FIG. 3.

The following describes this invention through some of the embodiments of the invention:

FIG. 3 is a block diagram showing in outline the arrangement of a dropout detector to which this invention is applied as a first embodiment thereof. FIG. 4 shows in detail the circuit arrangement of the dropout detector.

Referring to FIG. 3, a reproduced signal which is obtained from a magnetic recording medium (not shown) and is amplified by a preamplifier or the like is supplied via an input terminal 1 to two envelope detection circuits 2 and 3.

A detection signal which is outputted from the envelope detection circuit 2 is supplied to the negative pole input terminal of a comparator 5 and also to a knee circuit 4. The detection signal is compressed at the knee circuit 4 and, after that, is outputted from an output terminal 6 as a recorded/unrecorded detection signal. In other words, a circuit which is composed of the envelope detection circuit 2 and the knee circuit 4 as shown in FIG. 3 corresponds to a recorded/unrecorded detection circuit.

A detection signal outputted from the other envelope detection circuit 3 is supplied to the positive pole input terminal of the comparator 5. Then, a signal outputted from the comparator 5 is outputted from an output terminal 7 as a dropout detection signal before waveform shaping.

The details of the circuit arrangement shown in FIG. 3 are as described below with reference to FIG. 4:

Referring to FIG. 4, an input terminal 8 is arranged to receive a reproduced signal. Another input terminal 9 is arranged to receive a supply of constant voltage. A buffer circuit is formed by a transistor Q1 and a resistor R1 which are arranged at the input stage of the circuit arrangement. A DC bias addition circuit is formed, in the next stage, by a coupling capacitor C1, a transistor Q2 and resistors R2 and R3.

The output of the above-stated DC bias addition circuit is supplied to a second envelope detection circuit which is composed of a transistor Q3, resistors R4 and R5 and a capacitor C2, as well as to a first envelope detection circuit which is composed of a transistor Q4, resistors R6 and R7 and a capacitor C3.

The output of the second envelope detection circuit is supplied to the positive pole input terminal of a comparator which is formed by an integrated circuit IC1 and a resistor R8. The output of the first envelope detection circuit is supplied to the negative pole input terminal of the comparator and is also supplied via a buffer circuit consisting of a transistor Q5 and a resistor R9 to a knee circuit which consists of resistors R10 and R11 and a constant voltage Zener diode ZD1. A signal which is outputted from the knee circuit via an output terminal 10 is a recorded/unrecorded detection signal. A signal which is outputted from the comparator via an output terminal 11 is a dropout detection signal.

The DC bias addition circuit which is disposed next to the input-stage buffer circuit is arranged to determine the DC voltage value of a recorded/unrecorded detection signal when no signal is inputted from the input terminal 8 (i.e., in the case of a reproducing action on an unrecorded track) and also serves as a temperature compensation circuit which corrects any DC voltage drift that results from a change in the temperature of the first and second envelope detection circuits which are disposed at the next stage.

The input-stage buffer circuit, the DC bias addition circuit, the first envelope detection circuit, the output-stage buffer circuit and the knee circuit correspond to the recorded/unrecorded detection circuit.

With respect to the detection time constants of the first and second envelope detection circuits, the detection time constant of the first envelope detection circuit is determined, for example, by the product of resistors R6 and R7 and the capacitor C3. The detection sensitivity of the first envelope detection circuit is determined by the ratio between the resistors R6 and R7. Further, the first and second envelope detection circuits are arranged in the same manner and differ from each other only in the setting values of their detection time constants and detection sensitivity values.

More specifically, the detection time constant of the first envelope detection circuit is set at a value of the order of several milliseconds for the detection of a recorded or unrecorded state, while that of the second envelope detection circuit is set at a value of the order of several hundred nanoseconds.

As for the detection sensitivity, the detection sensitivity of the first envelope detection circuit is set at a smaller value than that of the second envelope detection circuit in such a way as to have the output of the comparator always at a high level when the reproduced signal supplied is in a normal state and has no dropout.

With the detection time constants and detection sensitivity values set in the above-stated manner, both the detection signal outputs of the first and second envelope detection circuits are capable of following amplitude variations taking place in the input reproduced signal for a period not shorter than several milliseconds, in the normal state of having no dropout in the input reproduced signal. The occurrence of fluctuations and waviness in the amplitude of the reproduced signal due to the magnetic recording medium contacting state of the magnetic head, the magnetic orientation characteristic of the medium, etc., can be easily eliminated without recourse to an automatic gain adjustment circuit.

In a case where, for example, a dropout takes place in the reproduced signal for a period of about one microsecond or thereabout, the first envelope detection circuit does not follow the dropout while the second envelope detection circuit alone follows it. In this case, therefore, the relation between the detection values of the first and second envelope detection circuits is reversed. The comparator, then, outputs a dropout signal at a low level for a period of time corresponding to the period of occurrence of the dropout.

Further, a difference in detection sensitivity between the first and second envelope detection circuits represents a dropout detection sensitivity determining up to what level of amplitude attenuation from the normal amplitude of the reproduced signal is to be regarded as a dropout. The sensitivity difference is normally set between −10 and −15 dB.

The detection sensitivity values of both the first and second envelope detection circuits are high. The detection signals of these circuits are, therefore, highly vulnerable to the adverse effects of the unevenness in the characteristics of transistors and changes of temperature. To avoid this, it is desirable to use a matched pair of transistors for the transistors Q3 and Q4.

Further, with a knee compression process performed by the knee circuit 4 on the detection signal outputted from the envelope detection circuit 2, i.e., the recorded/unrecorded detection signal, a sufficient dynamic range of tracking control over a reproduced signal can be ensured, in a case where the tracking control is to be performed with the recorded/unrecorded detection signal, even for greatly fluctuating amplitude of the reproduced signal (particularly in the event of a reproduced signal having a large amplitude).

As shown in FIGS. 3 and 4, the first embodiment is arranged to make the dropout detection by using the output of the envelope detection circuit which forms the recorded/unrecorded detection circuit. This arrangement enables the embodiment to stably detect dropouts without necessitating the provision of any additional automatic gain adjustment circuit for dropout detection.

In the first embodiment arranged as shown in FIG. 3, the envelope detection sensitivity of the envelope detection circuit 2 for the recorded/unrecorded detection is set at a relatively small value. Therefore, in a case where the tracking control is to be performed by using the recorded/unrecorded detection signal, the dynamic range of the tracking control becomes narrower by as much as the relative smallness of the envelope detection sensitivity.

For example, with the voltage varying range of the output of the second envelope detection circuit assumed to be from 1 to 3 V and the envelope detection sensitivity for the recorded/unrecorded detection to be set at −15 dB, the tracking control range becomes −15 dB of 2 V which is about 0.4 V. In a case where the tracking control signal is A/D (analog-to-digital) converted, the input dynamic range of the A/D converter which is not shown must be set by adjusting it also to that value.

Further, the transistors Q3 and Q4 shown in FIG. 4 have a great difference in gain between them. Therefore, the linearity of the circuit arrangement as an amplifier is sometimes not adequately obtainable when the amplitude of the input reproduced signal is small or large. As a result, the allowable range of amplitude fluctuations of the reproduced signal in a normal state becomes narrower due to the inadequacy of linearity.

Figure 5:
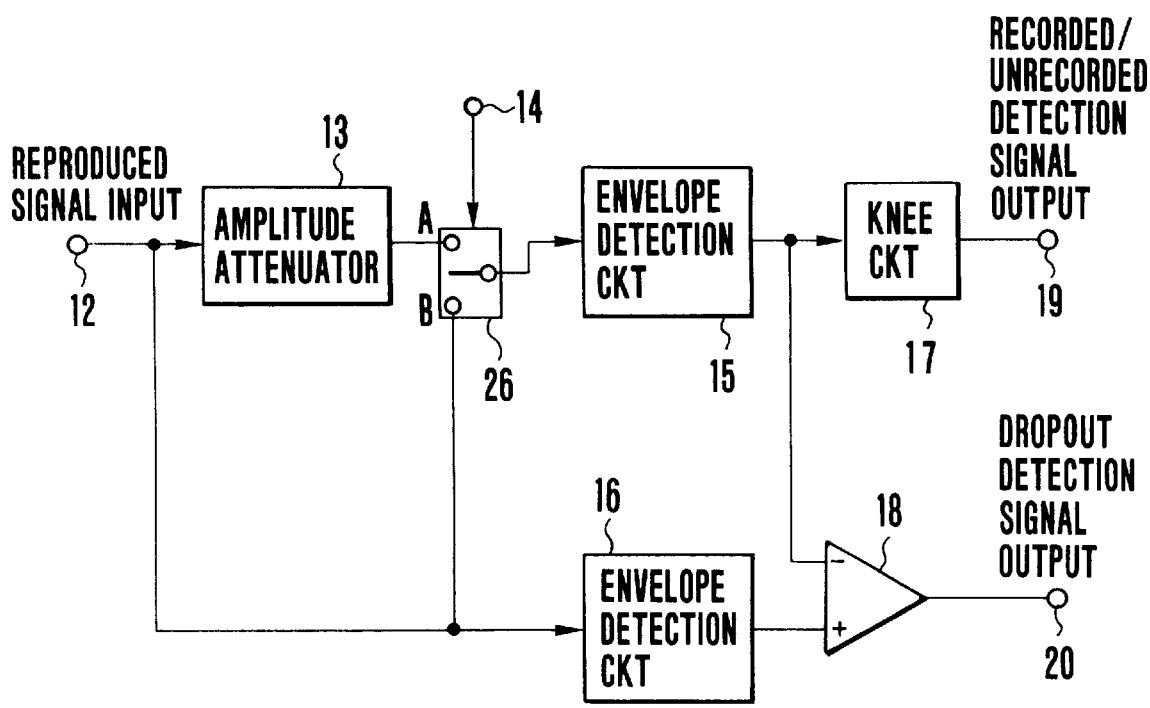
FIG. 5 is a block diagram showing in outline the arrangement of the dropout detector to which this invention is applied as a second embodiment thereof.
Figure 6:
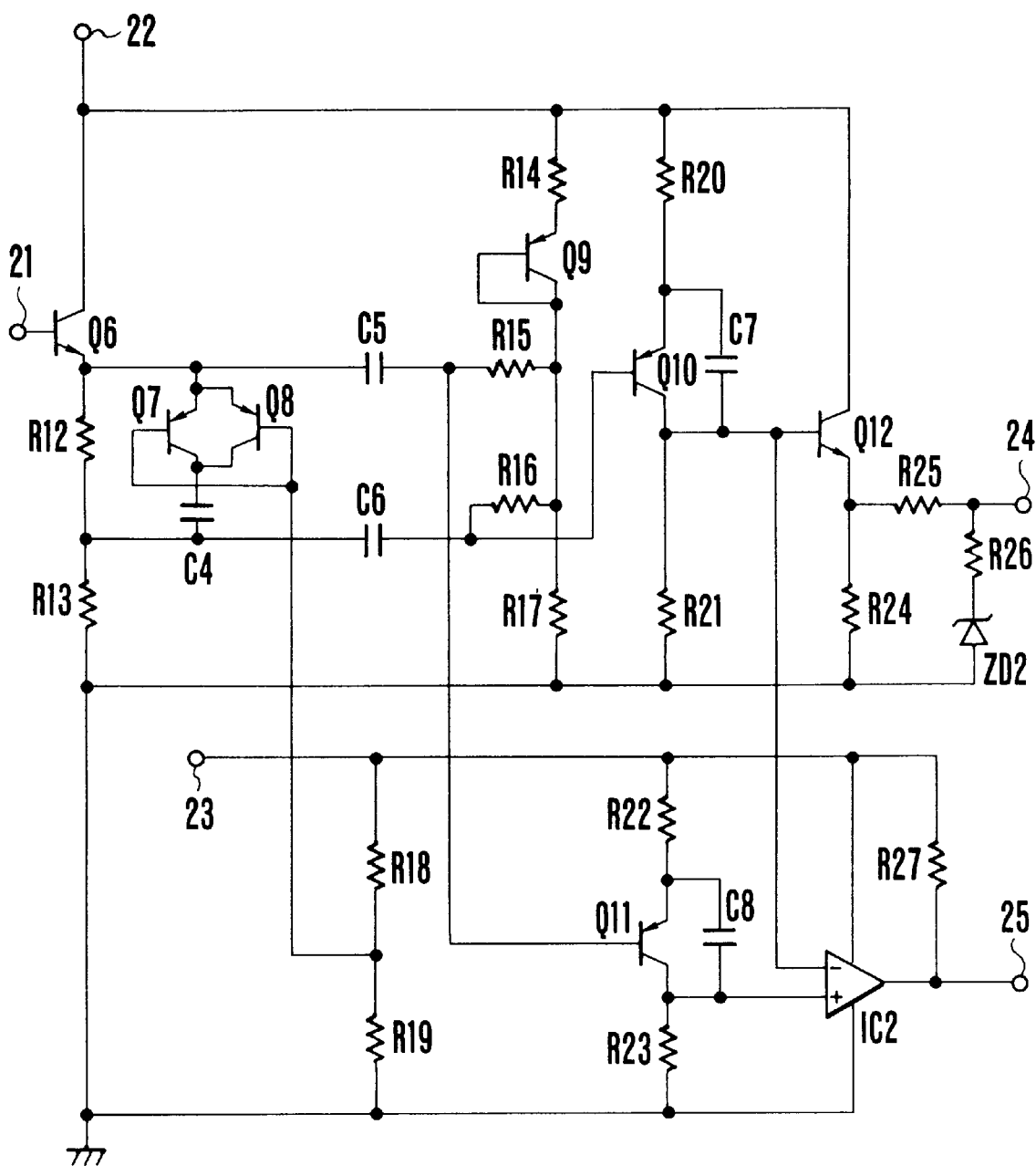
FIG. 6 is a circuit diagram showing the details of the dropout detector of FIG. 5.

A second embodiment of this invention is arranged to solve the above-stated problems. The second embodiment is described as follows:

FIG. 5 is a block diagram showing in outline the arrangement of a dropout detector to which this invention is applied as the second embodiment thereof. FIG. 6 shows the details of the circuit arrangement of the same dropout detector.

In the case of the second embodiment shown in FIG. 5, an amplitude attenuator 13 is arranged at the input stage of an envelope detection circuit 15 which is provided for recorded/unrecorded detection. The detection sensitivity of the envelope detection circuit 15 is set to be exactly the same as that of another envelope detection circuit 16 which is provided for dropout detection. A change-over switch 26 is arranged to be connected to one terminal A at the time of dropout detection and to another terminal B at the time of tracking control in accordance with a switch control signal supplied via an input terminal 14 from a system controller which is not shown. By virtue of this switch arrangement, a reproduced signal input coming through an input terminal 12 can be supplied to the envelope detection circuit 15 without passing through the amplitude attenuator 13 to prevent the dynamic range of the tracking control from becoming smaller.

Referring to FIG. 5, a reproduced signal which is obtained from a magnetic recording medium (not shown) and amplified by a preamplifier or the like is supplied through the input terminal 12. The amplitude of the input reproduced signal is attenuated at the amplitude attenuator 13 and, after that, is supplied via the change-over switch 26 to the envelope detection circuit 15 which is provided for recorded/unrecorded detection. The reproduced signal coming through the input terminal 12 is supplied also to the envelope detection circuit 16 for dropout detection.

A detection signal which is outputted from the envelope detection circuit 15 is subjected to a knee compression process at a knee circuit 17. The output of the knee circuit 17 is outputted from an output terminal 19 as a recorded/unrecorded detection signal.

The outputs of the envelope detection circuits 15 and 16 are supplied respectively to the negative-pole and positive-pole input terminals of a comparator 18. The output of the comparator 18 is outputted from an output terminal 20 as a dropout detection signal.

The circuit arrangement shown in FIG. 5 is described in detail with reference to FIG. 6 as follows:

In FIG. 6, a reference numeral 21 denotes an input terminal for the reproduced signal. A numeral 22 denotes an input terminal to which a constant voltage is supplied. A transistor Q6 and resistors R12 and R13 form a buffer circuit. The buffer circuit is arranged at the input stage of the circuit arrangement to attenuate the emitter output of the transistor Q6 according to the dividing ratio between the resistors R12 and R13. The buffer circuit corresponds to the amplitude attenuator 13 shown in FIG. 5.

Transistors Q7 and Q8 form an analog switch, which is arranged to allow the emitter output of the transistor Q6 to bypass the resistor R12 via a coupling capacitor C4 in a manner like an alternating current when both the transistors Q7 and Q8 are on.

When a dropout is detected, a system controller which is not shown inhibits the above-stated bypassing of the resistor R12 by applying a power supply to an input terminal 23 as a switch control signal, which causes the transistors Q7 and Q8 to be turned off by a DC bias voltage set by resistors R18 and R19.

Coupling capacitors C5 and C6, a transistor Q9 and resistors R14, R15, R16 and R17 form a DC bias adding circuit. The DC bias adding circuit is followed by an envelope detection circuit for the recorded/unrecorded detection which is formed by a transistor Q10, resistors R20 and R21 and a capacitor C7. An envelope detection circuit for the dropout detection is formed by a transistor Q11, resistors R22 and R23 and a capacitor C8. Other component elements and their circuit actions are omitted from description as they are similar to those of the first embodiment shown in FIGS. 3 and 4.

The envelope detection circuit 15 for detecting a recorded/unrecorded state and the envelope detection circuit 16 for detecting a dropout are arranged to have their detection time constants set exactly in the same manner as in the case of the first embodiment. However, the difference in detection sensitivity between these envelope detection circuits 15 and 16 are set by means of the amplitude attenuator 13 formed by the resistors R12 and R13 which are arranged at the input stage.

With the second embodiment arranged as described above, no power supply is applied to the input terminal 23 except when a dropout is detected. Therefore, with the exception of dropout detection, the analog switch formed by the transistors Q7 and Q8 is in an on-state to bypass the resistor R12 to allow a recorded/unrecorded detection signal to be outputted without attenuation, so that the dynamic range of tracking control can be prevented from decreasing in a case where the tracking control is to be performed by using the recorded/unrecorded detection signal.

At the time of dropout detection, since there is no difference in gain between the transistor Q10 included in the envelope detection circuit 15 and the transistor Q11 included in the other envelope detection circuit 16, the characteristics of these transistors Q10 and Q11 show no difference even in an operating area where the linearity of operation as an amplifier is otherwise apt to be impaired. Therefore, the detection signals outputted from the envelope detection circuits which respectively include these transistors can be compared with each other without any adverse influence. Compared with the first embodiment, therefore, the allowable range of amplitude fluctuations of the input reproduced signal can be improved by the arrangement described.

With the embodiment arranged, as described above, to detect dropouts by using the output of the envelope detection circuit which forms a recorded/unrecorded detection circuit, the dropout detection can be stably made without recourse to any additional automatic gain adjustment circuit. The invented arrangement thus not only permits a reduction in cost but also gives a greater allowance for amplitude fluctuations of the reproduced signal obtained from the recording medium. Therefore, in a case where tracking control is to be performed on the basis of the recorded/unrecorded detection signal which indicates whether or not an information signal is recorded in each of recording tracks formed on the recording medium, the dynamic range of the tracking control can be prevented from becoming smaller.

As described in the foregoing, in accordance with this invention, an information signal processing apparatus can be arranged to permit a simplification of arrangement and a reduction in size, weight and cost.

What is claimed is:

1. An information signal processing apparatus for processing information signals, comprising:

a) amplitude level attenuating means arranged to receive an information signal to attenuate the level of amplitude of the information signal inputted and to output a resultant signal;

b) output means arranged to receive both the information signal amplitude attenuated by said amplitude level attenuating means and the information signal not amplitude attenuated and to output either the amplitude attenuated information signal or the information signal not amplitude attenuated;

c) first detecting means for outputting a first detection signal which corresponds to a first amplitude level of the information signal outputted from said output means;

d) second detecting means for outputting a second detection signal which corresponds to a second amplitude level of the information signal inputted to said amplitude level attenuating means;

e) dropout detecting means arranged to compare the first detection signal outputted from said first detecting means with the second detection signal outputted from said second detecting means and to detect, according to the result of the comparison, whether or not a dropout has taken place in the information signal inputted to said amplitude level attenuating means and said second detecting means; and f) information signal input detecting means arranged to detect the presence or absence of the information signal inputted to said amplitude level attenuating means and said second detecting means according to whether or not the first detection signal has been outputted from said first detecting means.

2. An apparatus according to claim 1, wherein said second detecting means is arranged to have a larger detection gain than said first detecting means.

3. An apparatus according to claim 1, wherein said information signal includes a reproduced information signal reproduced from a recording medium.

4. An apparatus according to claim 1, wherein said output means is arranged to output the information signal amplitude attenuated by said amplitude level attenuating means when said information signal input detecting means is detecting the presence or absence of the information signal inputted to said amplitude level attenuating means and said second detecting means and to output the information signal not amplitude attenuated by said amplitude level attenuating means when said dropout detecting means is detecting whether or not a dropout has taken place in the information signal inputted to said amplitude level attenuating means and to said second detecting means.

* * * * *

UNITED STATES PATENT AND TRADEMARK OFFICE
CERTIFICATE OF CORRECTION

PATENT NO. : 6,185,361 B1
APPLICATION NO. : 08/385727
DATED : February 6, 2001
INVENTOR(S) : Makoto Ise Page 1 of 1

It is certified that error appears in the above-identified patent and that said Letters Patent is hereby corrected as shown below:

Col. 1, line 17, delete "recording/reproducting" and insert -- recording/reproducing --.
Col. 4, line 45, delete "comprises:" and insert -- comprises --.

Signed and Sealed this

Second Day of January, 2007

JON W. DUDAS
*Director of the United States Patent and Trademark Office*